United States Patent [19]

McGee

[11] Patent Number: 4,606,320

[45] Date of Patent: Aug. 19, 1986

[54] FUEL PREHEATING UNIT

[76] Inventor: Keith F. McGee, Rte. 6, Box 869, New Iberia, La. 70560

[21] Appl. No.: 818,749

[22] Filed: Jan. 14, 1986

[51] Int. Cl.⁴ .............................................. F02M 31/00
[52] U.S. Cl. .................... 123/557; 123/549; 219/301
[58] Field of Search ................ 123/557, 549; 219/205, 219/301, 206, 535, 207; 165/51, 52; 261/142

[56] References Cited

U.S. PATENT DOCUMENTS

| 1,065,580 | 6/1913  | Beucus ................... 123/549 |
| 1,278,880 | 9/1918  | Deorlow .................. 123/549 |
| 1,401,500 | 12/1921 | Scott ..................... 219/301 |
| 2,851,027 | 9/1958  | Kivela .................... 123/549 |
| 4,212,275 | 7/1980  | Inoue ..................... 123/557 |
| 4,325,345 | 4/1982  | Wilkinson ................. 123/557 |
| 4,423,712 | 1/1984  | Glass ..................... 123/557 |
| 4,424,422 | 1/1984  | Bell ...................... 123/557 |

Primary Examiner—Ronald H. Lazarus
Attorney, Agent, or Firm—B. P. Fishburne, Jr.

[57] ABSTRACT

A fuel preheating unit for internal combustion engines is placed between the carburetor and fuel pump. The unit consists of spaced concentric insulating sleeves surrounding the fuel line and held in assembled relationship by end plates. An electrical heating element includes several wire turns immediately surrounding the interior insulating sleeve with wire terminals extending exteriorly of the unit. The unit is encased in a body of insulating material, such as asbestos cement.

4 Claims, 3 Drawing Figures

FUEL PREHEATING UNIT

BACKGROUND OF THE INVENTION

Fuel preheaters for internal combustion engines are known in the prior art and are generally for the purpose of improving engine starting and efficiency of operation with a reduction of air pollutants.

Some prior art devices for this purpose are electrically operated and examples of electrical devices are disclosed in U.S. Pat. Nos. 4,342,303 and 4,391,259. In the latter patent, an axially short electrical heating element is exposed inside of a fuel heating chamber placed in the fuel line leading to the carburetor.

Other known fuel preheating devices are non-electrical and derive heat from the internal combustion engine cooling system. An example of this is shown in U.S. Pat. No. 4,395,997.

The known prior art devices have tended to be too complex and costly in their constructions to be fully practical. Moreover, they have failed to increase the operational efficiency of the engine to a degree necessary to justify the installation and use of the device.

Accordingly, it is the object of the present invention to provide a fuel preheating unit of the above-mentioned type which is simpler and less costly to manufacture and install than known prior art devices and which provides significantly greater advantages than any of the known devices for the same general purpose. More particularly, the fuel preheater according to the present invention causes more complete and efficient burning of gasoline, therefore resulting in significantly better mileage in automotive usage. It lessens the cost of engine maintenance by reducing engine wear, due to the elimination of wet gasoline which may pass around the piston rings. These and other known advantages stated in the prior art patents are present in this invention.

A further object of the invention is to provide a fuel preheating unit of extremely simplified construction which is easy to install and requires virtually no attention or maintenance after installation.

Other features and advantages of the invention will become apparent to those skilled in the art during the course of the following description.

DETAILED DESCRIPTION

Figure 1:
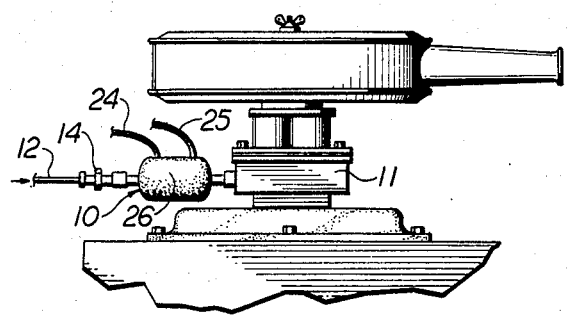
FIG. 1 is a side elevation of a fuel preheating unit according to the present invention in its installed state.
Figure 2:
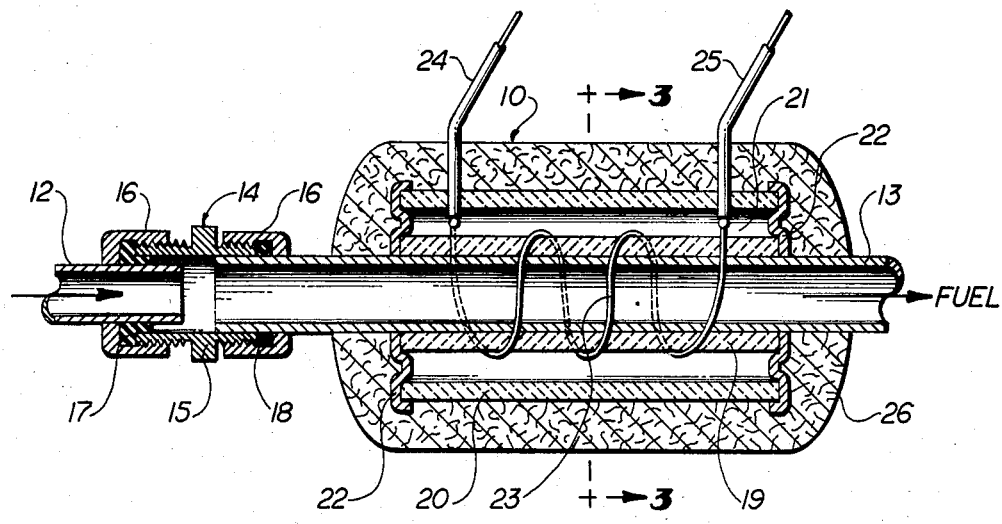
FIG. 2 is an enlarged central vertical longitudinal section through the unit.
Figure 3:
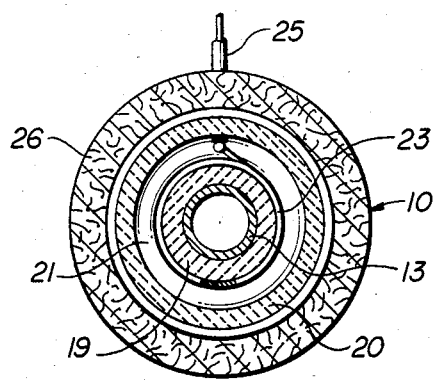
FIG. 3 is a transverse vertical section taken on line 3—3 of FIG. 2.

Referring to the drawings in detail wherein like numerals designate like parts throughout, a fuel preheating unit 10 according to the present invention is placed between the engine carburetor 11 and the customary fuel pump, not shown, which delivers fuel to the carburetor through a fuel line 12.

The preheating unit 10 comprises a central axial preferably stainless steel tube 13 connected to the existing fuel line 12 through a coupling means 14. While the coupling means 14 can vary in its construction, typically it comprises a threaded nipple 15 engaged by two coupling nuts 16 containing seals 17 and 18 which sealingly engage the fuel line 12 and the tube 13 of the preheating unit 10. The tube 13 can be directly connected with the carburetor 11 by conventional means or can be connected with a further short length of the fuel line 12 by another coupling means 14, somewhat upstream from the carburetor.

The unit 10 further comprises an inner preferably alumina ceramic sleeve 19 of cylindrical construction closely surrounding the tube 13. A second sleeve 20 of the same material surrounds tube 19 in spaced concentric relationship thereto to provide an annular dead air space 21 between the two ceramic insulator sleeves 19 and 20, which sleeves have the same lengths.

Corrugated end plates 22 engage the ends of the two sleeves 19 and 20 and hold them in properly spaced assembled relationship. The end plates 22 have annular corrugations which receive the ends of the two sleeves, and the end plates have center openings which receive the tube 13 in close fitting relationship.

The unit 10 further comprises a Nicrome wire electrical heating element 23 closely surrounding the inner sleeve 19 and wrapped thereon in several convolutions or turns so that the heating element 23 spans a major portion of the length of the sleeve 19. The heating element 23 is wrapped closely or snugly on the sleeve 19, as shown in the drawings. End terminals 24 and 25 of the heating element 23 project radially outwardly of the unit 10 for connection in the ignition circuit of an automobile or truck.

The entire fuel preheating unit 10 including portions of the wire terminals 24 and 25 is encased in a body 26 of insulating material such as asbestos cloth. This outer insulating body or casing 26 also serves to unite the sleeves 19 and 20 with the end plates 22 and the tube 13. The arrangement is such that no other fastening means, such as screws, for the fuel preheating unit is required. The assembly is self-contained and unitized, and therefore simple and economical to manufacture and install. The device is highly efficient in its operation due to the heat retaining insulating elements and the fact that the electrical heating element 23 spans a major part of the length of the unit.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A fuel preheating unit for engines comprising an interior metal tube adapted for connection in a fuel line, first and second insulator sleeves surrounding said tube in spaced substantially concentric relationship, end plates surrounding said tube and being interengaged with the ends of said sleeves and holding said sleeves in said spaced concentric relationship, an electrical wire heating element surrounding the innermost of the first and second sleeves and having plural turns on the innermost sleeve extending for a major portion of the length of such sleeve and the length of the unit, and a body of thermal insulating material surrounding and enclosing at least a portion of said tube and completely enclosing said sleeves and end plates, and said heating element having end terminals projecting exteriorly of said body of thermal insulating material.

2. A fuel preheating unit for engines as defined in claim 1, and said first and second sleeves comprising cylindrical sleeves formed of a ceramic material, and said end plates having annular corrugations forming locating seats for the ends of said sleeves.

3. A fuel preheating unit for engines as defined in claim 2, and the interior one of the sleeves closely surrounding said tube, and there being a substantially dead air space between said sleeves and between said end plates.

4. A fuel preheating unit particularly for internal combusion engines comprising a metal tubing section, a first insulator sleeve closely surrounding the tubing section, a second insulator sleeve of the same length as the first sleeve and being of a greater diameter than the first sleeve surrounding the first sleeve in spaced concentric relationship, a pair of corrugated end plates abutting the ends of said sleeves and having annular concentric corrugations forming locator seats for the ends of said sleeves, said sleeves being cylindrical, a resistance wire heating element closely wound around the exterior of the first sleeve and having a plurality of turns spanning a major portion of the length of the first sleeve and said unit, and a body of insulating material enclosing said sleeves and end plates and surrounding the tubing section and serving to unite the sleeves, end plates and tubing section, and the resistance wire heating element having end terminals projecting radially through apertures in the second sleeve near the ends of the second sleeve and projecting radially through said body of insulating material.

* * * * *